(12) United States Patent
Kuang et al.

(10) Patent No.: US 12,353,969 B2
(45) Date of Patent: *Jul. 8, 2025

(54) SYSTEM AND METHOD FOR EXAMINING DATA FROM A SOURCE

(71) Applicant: The Toronto-Dominion Bank, Toronto (CA)

(72) Inventors: Yunyu Kuang, Waterloo (CA); Chun Yau Hao, Oakville (CA); Hugo Adolfo Gonçalves Cibrão, Toronto (CA); Nicholas Victor Laurence Morin, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,556

(22) Filed: Nov. 1, 2023

(65) Prior Publication Data

US 2024/0062117 A1 Feb. 22, 2024

Related U.S. Application Data

(63) Continuation of application No. 16/455,100, filed on Jun. 27, 2019, now Pat. No. 11,842,252.

(51) Int. Cl.
  *G06F 17/18* (2006.01)
  *G06F 16/2458* (2019.01)
  (Continued)

(52) U.S. Cl.
  CPC ......... *G06N 20/00* (2019.01); *G06F 16/2462* (2019.01); *G06F 16/248* (2019.01); *G06F 17/18* (2013.01)

(58) Field of Classification Search
  None
  See application file for complete search history.

(56) References Cited

U.S. PATENT DOCUMENTS 7,218,974 B2  5/2007  Rumi et al.
8,073,729 B2  12/2011  Kisin
(Continued)

FOREIGN PATENT DOCUMENTS

EP  3454259 A1  3/2019

OTHER PUBLICATIONS

Widodo, A. and Budi I., ""Model selection for time series forecasting using similarity measure,"" 2011 International Conference on Advanced Computer Science and Information Systems, Jakarta, Indonesia, 2011, pp. 221-226. (Year: 2011).

(Continued)

*Primary Examiner* — Ariel Mercado-Vargas
(74) *Attorney, Agent, or Firm* — CPST Intellectual Property Inc.; Brett J. Slaney

(57) ABSTRACT

A system and method are provided for examining data from a source. The method is executed by a device having a processor and includes receiving a set of historical data and a set of current data to be examined, from the source. The method also includes generating multiple statistical models based on the historical data and a forecast for each model. The method also includes selecting one of the multiple statistical models based on at least one criterion, and generating a new forecast using the selected model. The method also includes comparing the set of current data against the new forecast to identify any data points in the set of current data with unexpected values. The method also includes outputting a result of the comparison, the result comprising any data points with unexpected values.

20 Claims, 11 Drawing Sheets

(51) Int. Cl.
  *G06F 16/248*   (2019.01)
  *G06N 20/00*    (2019.01)

(56) References Cited

U.S. PATENT DOCUMENTS

| | | | |
|---|---|---|---|
| 8,751,436 B2 | 6/2014 | Lowry et al. | |
| 9,047,559 B2* | 6/2015 | Brzezicki | G06N 7/01 |
| | | | 703/2 |
| 9,098,617 B1 | 8/2015 | Pauley, Jr. et al. | |
| 9,104,709 B2 | 8/2015 | Chaturvedi et al. | |
| 9,535,905 B2 | 1/2017 | Viartinez Corria et al. | |
| 9,600,776 B1 | 3/2017 | Daly et al. | |
| 9,721,311 B2 | 8/2017 | Babai | |
| 9,798,788 B1 | 10/2017 | Reiner et al. | |
| 9,836,713 B2 | 12/2017 | Bagchi et al. | |
| 10,223,425 B2 | 3/2019 | Kephart et al. | |
| 10,241,887 B2 | 3/2019 | Poghosyan et al. | |
| 2004/0030667 A1 | 2/2004 | Xu | |
| 2006/0161403 A1* | 7/2006 | Jiang | G06N 20/00 |
| | | | 703/2 |
| 2011/0173116 A1 | 7/2011 | Yan | |
| 2013/0338986 A1 | 12/2013 | Yrnes et al. | |
| 2014/0164059 A1* | 6/2014 | Dove | G06N 5/01 |
| | | | 705/7.31 |
| 2015/0088783 A1 | 3/2015 | Mun | |
| 2015/0220868 A1 | 8/2015 | Elashoff | |
| 2016/0371612 A1* | 12/2016 | Bagchi | G06Q 10/06395 |
| 2017/0011437 A1 | 1/2017 | Parameswaran | |
| 2017/0372228 A1* | 12/2017 | Daly | G06N 20/00 |
| 2018/0060744 A1 | 3/2018 | Achin | |
| 2018/0144815 A1 | 5/2018 | Chapman-McQuiston | |
| 2018/0234420 A1* | 8/2018 | Mattes | G06Q 20/40145 |
| 2019/0087741 A1 | 3/2019 | Wu | |
| 2019/0236497 A1* | 8/2019 | Santos | G06N 7/00 |
| 2019/0303796 A1* | 10/2019 | Balasubramanian | G06N 7/01 |
| 2020/0065212 A1* | 2/2020 | Chanda | G06F 11/3075 |
| 2020/0394462 A1 | 12/2020 | Hild | |
| 2021/0103858 A1 | 4/2021 | Padmanabhan | |

OTHER PUBLICATIONS

Thapar, H. and Shashvat, K. "Predictive Analysis and Forecasting of S&P CNX NIFTY50 using Stochastic Models," 2018 First International Conference on Secure Cyber Computing and Communication (ICSCCC), Jalandhar, India, 2018, pp. 122-127. (Year: 2018).

Kulikowski, Juliusz L.; Abstract for Encyclopedia of Database Technologies and Applications; Jan. 2005.

* cited by examiner

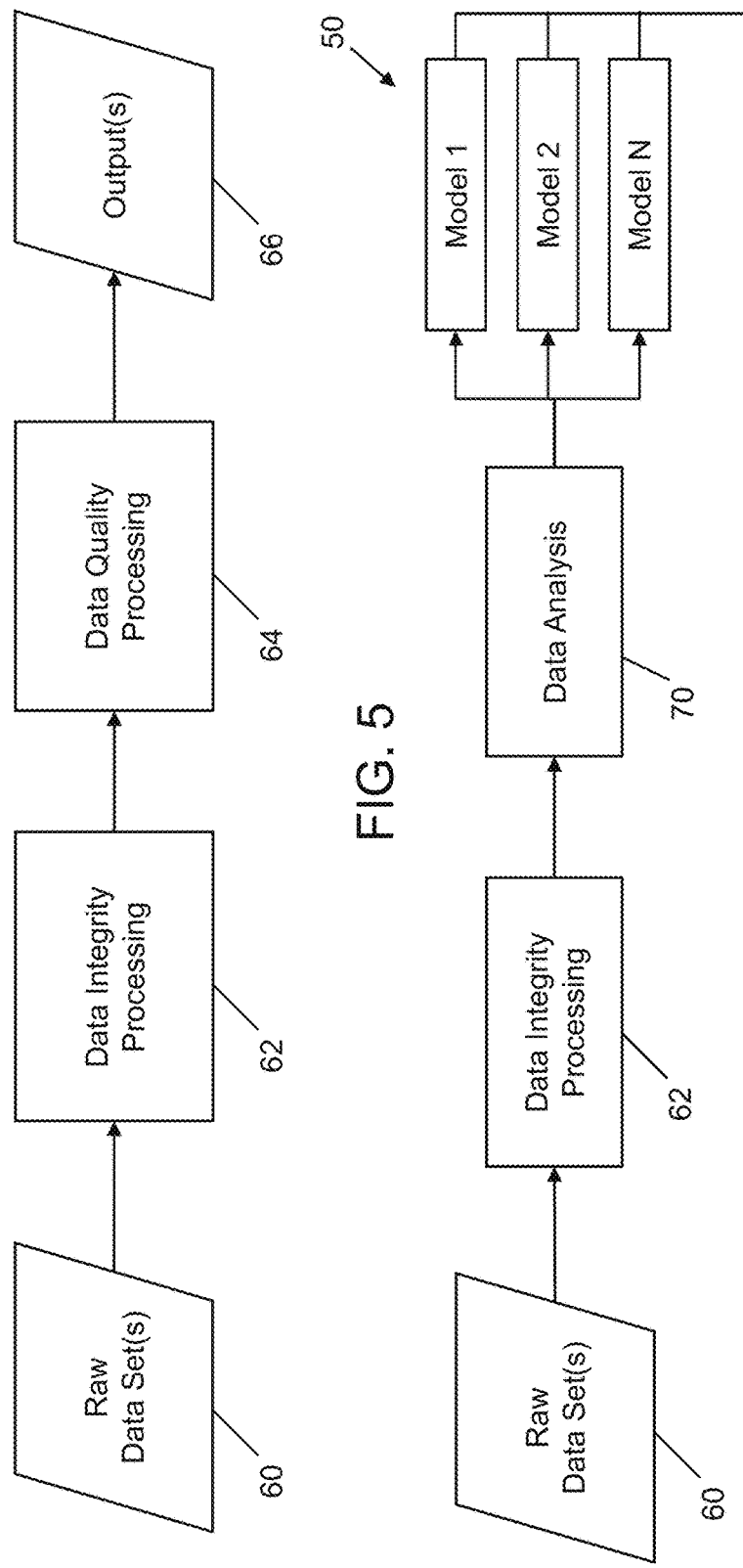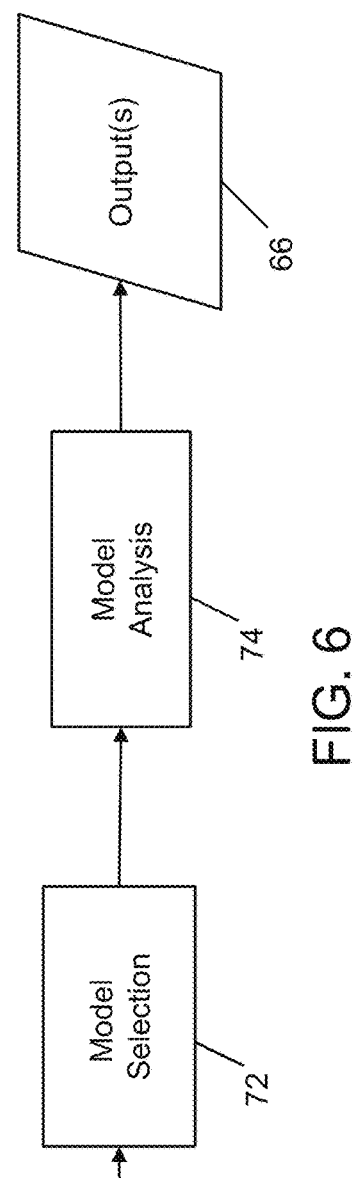

SYSTEM AND METHOD FOR EXAMINING DATA FROM A SOURCE

CROSS-REFERENCE TO RELATED APPLICATION(S)

This application is a Continuation of U.S. patent application Ser. No. 16/455,100 filed on Jun. 27, 2019, now U.S. Pat. No. 11,842,252, the contents of which are incorporated by reference in their entirety.

TECHNICAL FIELD

The following relates generally to examining data from a source.

BACKGROUND

Data that is used in a process such as in conducting an analysis or in generating a report may be obtained or received from another entity, referred to herein as a source. The source may be an external source or an internal source. As such, often the process that uses the data is not responsible for the creation, let alone the integrity, accuracy, or completeness of the data. This means that the process relies on the source of the data for maintaining such integrity, accuracy, and completeness. When the sourced data is of poor quality, the output of the process can be of poor quality, even when the process itself is operating flawlessly. That is, poor data inputs can lead to poor results that can reflect poorly on those taking ownership of the process, to downstream consumers of the data, including the public.

In one illustrative scenario, unexpected values in data from externally sourced data could undermine a stakeholder's confidence in model scoring results reported by a financial institution. For example, certain government and other external organizations publish statistical data that may be utilized as inputs in model scoring processes. However, it is recognized that many of such organizations do not have data integrity controls in place. Without data integrity controls, the process or system that uses the published statistical data would need to assume that the externally sourced data is accurate, which may not be the case. This can lead to a reliance on inaccurate or "bad" data in analyzing, scoring or otherwise reporting something to the public. Often, errors stemming from this inaccurate or bad data are not caught until much later. Similar issues can arise when relying on an internal source of data within an enterprise, which is used in another process.

BRIEF DESCRIPTION OF THE DRAWINGS

Embodiments will now be described with reference to the appended drawings wherein:

FIG. 5 is a flow diagram illustrating an example of computer executable stages performed in data integrity processing and data quality processing.

FIG. 6 is a flow diagram illustrating an example of computer executable stages in a data quality check workflow.

DETAILED DESCRIPTION

Figure 1:
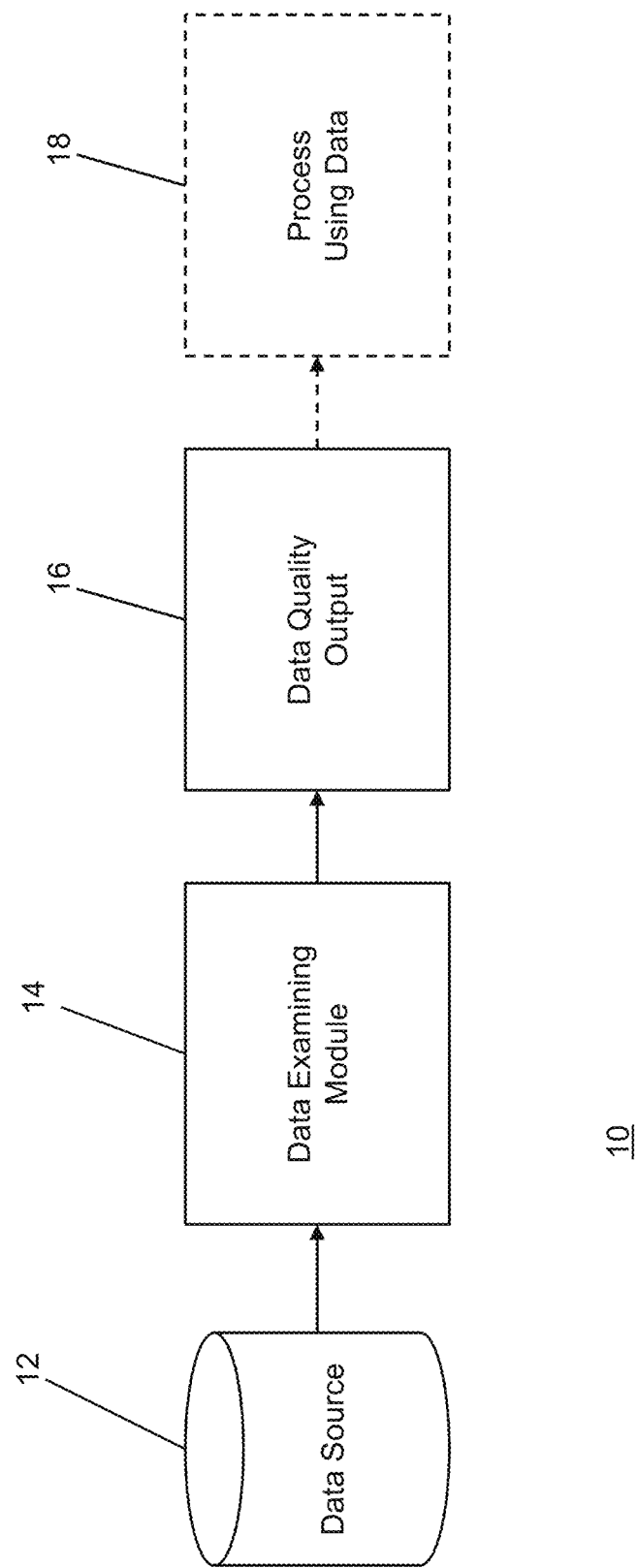
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

Organizations and individuals that rely on data from a source, whether the data is externally or internally sourced, would benefit from a way to automatically or within minimal effort, examine and check the quality and integrity of the data. A tool may be provided to determine, e.g., on a time-series based dataset, if the sourced data exists or if the dataset is missing any datapoints from the source. The tool can also execute a series of statistical models to confirm that any new observations are within expected ranges. These statistical models can be automatically refreshed when new data from the source is examined and can select a preferred model, e.g., from constant, linear and quadratic models. The tool can run data integrity checks in order to determine potential errors or anomalies, and provide an output, such as a report or flag in a graphical user interface (GUI), or by interrupting or stopping a process that uses the data until the potential errors or anomalies are investigated. In this way, data integrity can be vetted in advance of a process that is downstream from a source of data.

Certain example systems and methods described herein enable data integrity from a source of data, either external or internal, to be checked for new data that is used in a process. In one aspect, there is provided a device for examining data from a source. The device includes a processor, a data interface coupled to the processor, and a memory coupled to the processor. The memory stores computer executable instructions that when executed by the processor cause the processor to receive via the data interface, a set of historical data and a set of current data to be examined, from the source, generate a plurality of statistical models based on the historical data and a forecast for each model, and select one of the plurality of statistical models based on at least one criterion. The computer executable instructions also cause the processor to generate a new forecast using the selected model, compare the set of current data against the new forecast to identify any data points in the set of current data with unexpected values, and output a result of the comparison, the result comprising any data points with the unexpected values.

In another aspect, there is provided a method of examining data from a source. The method is executed by a device having a processor and includes receiving a set of historical data and a set of current data to be examined, from the source, generating a plurality of statistical models based on the historical data and a forecast for each model, and selecting one of the plurality of statistical models based on at least one criterion. The method also includes generating a new forecast using the selected model, comparing the set of current data against the new forecast to identify any data points in the set of current data with unexpected values, and outputting a result of the comparison, the result comprising any data points with the unexpected values.

In another aspect, there is provided non-transitory computer readable medium for examining data from a source. The computer readable medium includes computer executable instructions for receiving a set of historical data and a set of current data to be examined, from the source, generating a plurality of statistical models based on the historical data and a forecast for each model, and selecting one of the plurality of statistical models based on at least one criterion. The computer readable medium also includes instructions for generating a new forecast using the selected model, comparing the set of current data against the new forecast to identify any data points in the set of current data with unexpected values, and outputting a result of the comparison, the result comprising any data points with the unexpected values.

In certain example embodiments, a result of the comparison can be uploaded to a graphical user interface.

In certain example embodiments, data points with unexpected values can be flagged in association with a process that uses the current data.

In certain example embodiments, the current data can be examined prior to being used in a process. The process that uses the current data can be interrupted when the result comprises at least one data point with an unexpected value.

In certain example embodiments, the plurality of statistical models can be trained by training a first model for a first period of time before an actual period in which to capture the unexpected values, forecasting and comparing data from a second period of time against the current data, and repeating the training and forecasting for each of the plurality of statistical models. Generating the new forecast using the selected model can include executing the selected model with a parameter having a smallest sum of R-squared from the forecasting and comparing.

In certain example embodiments, comparing the current data to the new forecast can include running forecasts for the actual period and comparing the current data against at least one prediction interval from the new forecast to capture the unexpected values.

In certain example embodiments, the source includes an external source of the current data.

In certain example embodiments, the source includes an internal source of the current data.

In certain example embodiments, the plurality of statistical models comprise one or more of a constant model, a linear model, and a quadratic model. The constant model can include applying a single exponential smoothing, the linear model can include applying a double exponential smoothing, and the quadratic model can include applying a triple exponential smoothing.

In certain example embodiments, the process can automatically execute when receiving new data from the source.

In certain example embodiments, the current and historical data are time-series-based data.

In certain example embodiments, data points are deemed to be expected if one or more of the following is satisfied: the data point is outside of a 95% prediction interval built on a pre-processed dataset; and the data point is outside of the 95% prediction interval from the pre-processed data that was reverted back to an original scale.

In certain example embodiments, raw data can be received from the source via the data interface, and at least one data integrity operation applied on the raw data. The at least one data integrity operation can include any one or more of: a missing data check, a dataset size check, and date formatting operation to generate a valid time-series.

FIG. 1 illustrates an exemplary computing environment 10 in which data from a data source 12 is examined by a data examining module 14. In this exemplary environment 10, the data examining module 14 is operated by a device (not shown) having a processor, memory, and an interface to or with the data source 12 and obtains or receives data sets from the data source 12 via such an interface. The data examining module 14 examines the data to perform a data quality review to generate a data quality output 16 such as a summary, report, or flag displayed in a GUI of a software program used by an organization or individual. The data quality review may be performed to optionally screen or vet the data prior to be used by a downstream process 18 that uses the data. For example, the process 18 may include generating a model scoring report that relies on external data and is subsequently reported to the public, e.g., analyzing statistics such as housing price indices, unemployment rates, etc. It can be appreciated that the computing environment 10 shown in FIG. 1 can be adapted to be integrated into any computing system, device, or platform, including an existing organization such as a financial institution.

The data examining module 14 and process 18 can be incorporated into various use cases. For example, as noted above, externally-sourced data used in model scoring can be checked to avoid undermining the confidence of stakeholders. That is, the presently described process can be applied on time-series based macroeconomic data being used in a model development and model implementation scoring cycle. For example, housing price indices from registry entities, unemployment rates from government bodies, etc.

The presently described process can also be used to assist in monitoring internal data such as performance variables, utilization variables, and segment variables, which are used as model inputs from intermediate datasets. If the model results indicate either underperformance or overperformance, the process can be used to examine if issues stem from incorrect or incomplete data sources rather than the performance of the process itself.

The presently described process can also be used to monitor and examine file sizes in performing internal information technology audits. The process can be used to detect system errors such as a sudden disruption of the system while running jobs. Such a sudden disruption may cause the data to be incomplete but may not include an error message or warning in a log. The process can inhibit passing problematic source files to downstream stakeholders.

The presently described process can also be used as a time-series forecasting tool. For example, the process can be used to indicate the upper and lower ranges of the next entry in a time-series. This can have advantages in training and refreshing itself each time the process re-runs. The process can also be customizable for adjusting time periods of training and forecasting, trend options, thresholds, and weight options, etc. This can apply to both stationary and non-stationary univariate time-series.

Figure 2:
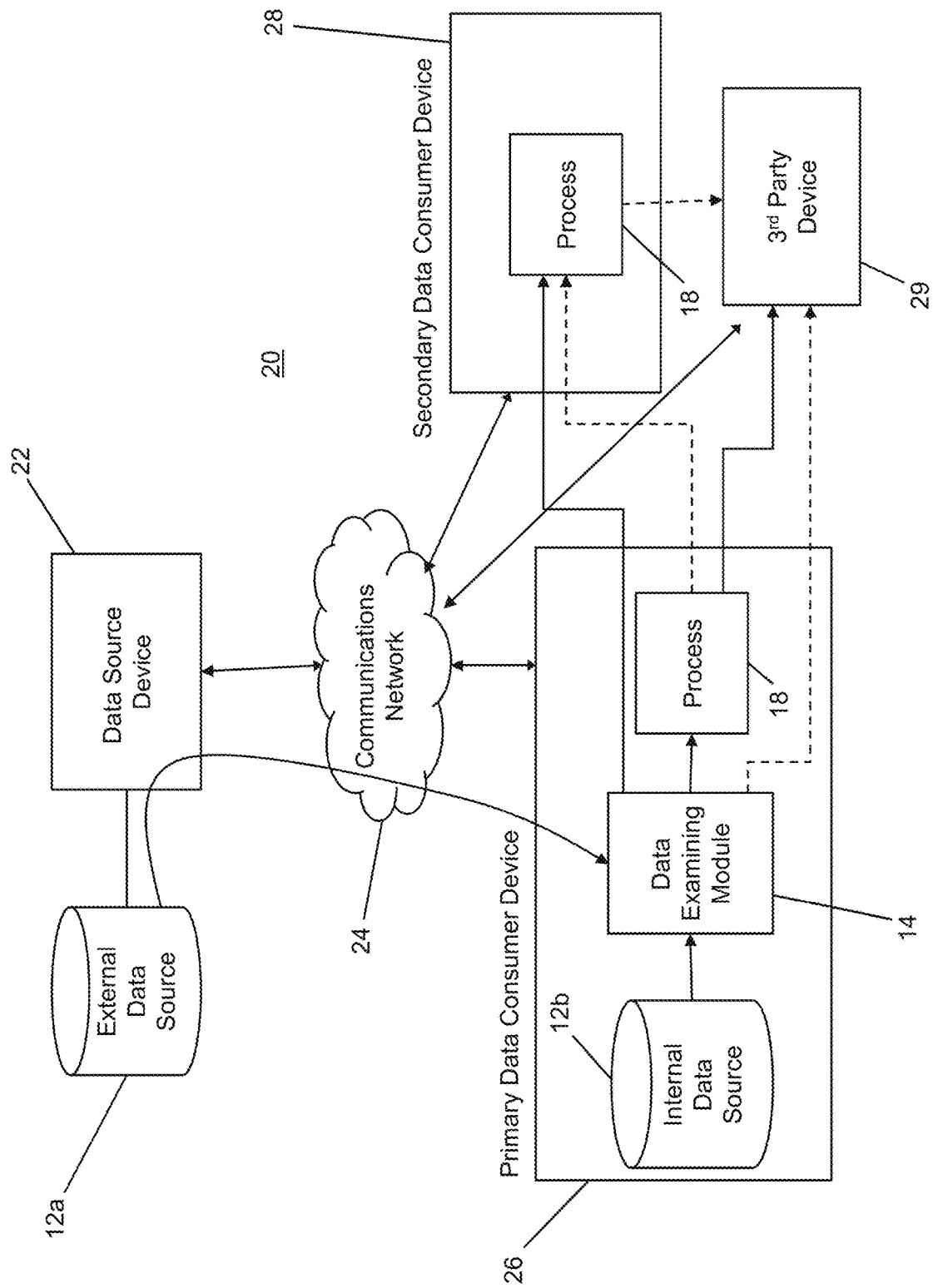
FIG. 2 is a schematic diagram of another example computing environment.

FIG. 2 illustrates another exemplary computing environment 20 to which the configuration shown in FIG. 1 has been adapted. In one aspect, the computing environment 20 may include a primary data consumer device 26, one or more data source devices 22 providing or otherwise having access to external data sources 12a, and a communications network 24 connecting one or more components of the computing environment 20. The computing environment 20 may also include one or more secondary data consumer devices 28. In the example shown in FIG. 2, the secondary data consumer device 28 receives data via the primary data consumer device 26 after the data has undergone a data quality check by a data examining module 14. For example, the secondary data consumer device 28 may be associated with another organization that relies on the data after having been processed by the primary data consumer device 26. The computing environment 20 may also include one or more $3^{rd}$ party devices 29. The $3^{rd}$ party device 29 may be considered similar to the secondary data consumer device 28 but in this example does not necessarily further process the data that has been examined by the primary data consumer device 26. For example, the $3^{rd}$ party device 29 may correspond to a member of the public that consumes a report, score, or result generated by the process 18.

It can be appreciated that the $3^{rd}$ party device 29 may also receive data that has been further processed by the secondary data consumer device 28 (as illustrated in dashed lines in FIG. 2). It can also be appreciated that the secondary data consumer device 28 and $3^{rd}$ party device 29 may include an application programming interface (API) or other interface mechanism or module for interfacing with the primary data consumer device 26 (or each other) either directly or via the network 24. Similarly, the primary data consumer device 26 may include an API or other interface mechanism or module for interfacing with the external data source 12a via the data source device 22. The data source device 22 is shown to illustrate one example in which an entity or organization responsible for the external data source 12a communicates with the primary data consumer device 26 via the network 24. However, in other configurations, the primary data consumer device 26 may be capable of accessing the external data source 12a directly, without communicating via another device. It can be appreciated that a primary data consumer device 26 may in another scenario become a secondary data consumer device 28 and vice versa. As such, the scenario and configuration depicted in FIG. 2 provides one example for the sake of illustration.

As illustrated in FIG. 2, the primary data consumer device 26 may also include or have access to an internal data source 12b, that is, data that is generated or otherwise made available within a same entity or organization. For example, data generated in one business unit of a financial institution may be used in other downstream processes 18 and therefore could benefit from execution of the data examining module 14 prior to using the internally sourced data 12b. In one embodiment, the primary data consumer device 26 may be one or more computer systems configured to process and store information and execute software instructions to perform one or more processes consistent with the disclosed embodiments.

The primary data consumer device 26 may also include or be a component or service provided by a financial institution system (e.g., commercial bank) that provides financial services accounts to users, processes financial transactions associated with those financial service accounts, and analyzes statistical data to inform investors, customers, and the public generally. Details of such a financial institution system have been omitted for clarity of illustration. The primary data consumer device 26 may also include or be a component or service provided by other types of entities and organizations, such as government bodies and private enterprises that would benefit from checking the integrity of data which they did not necessarily generate.

In certain aspects, data source device 22 (that provides or provides access to the external source of data 12a) can include, but is not limited to, a personal computer, a laptop computer, a tablet computer, a notebook computer, a handheld computer, a personal digital assistant, a mobile phone, an embedded device, a smart phone, a virtual reality device, an augmented reality device, third party portals, and any additional or alternate computing device, and may be operable to transmit and receive data across communication network 24.

Communication network 24 may include a telephone network, cellular, and/or data communication network to connect different types of devices as will be described in greater detail below. For example, the communication network 24 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

The computing environment 20 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the primary data consumer device 26, secondary data consumer device 28, $3^{rd}$ party device 29, and data source device 22. The cryptographic server may be used to protect the data or results of the data by way of encryption for data protection, digital signatures or message digests for data integrity, and by using digital certificates to authenticate the identity of the users and devices within the computing environment 20, to inhibit data breaches by adversaries. It can be appreciated that various cryptographic mechanisms and protocols can be chosen and implemented to suit the constraints and requirements of the particular deployment of the computing environment 20 as is known in the art.

Figure 3:
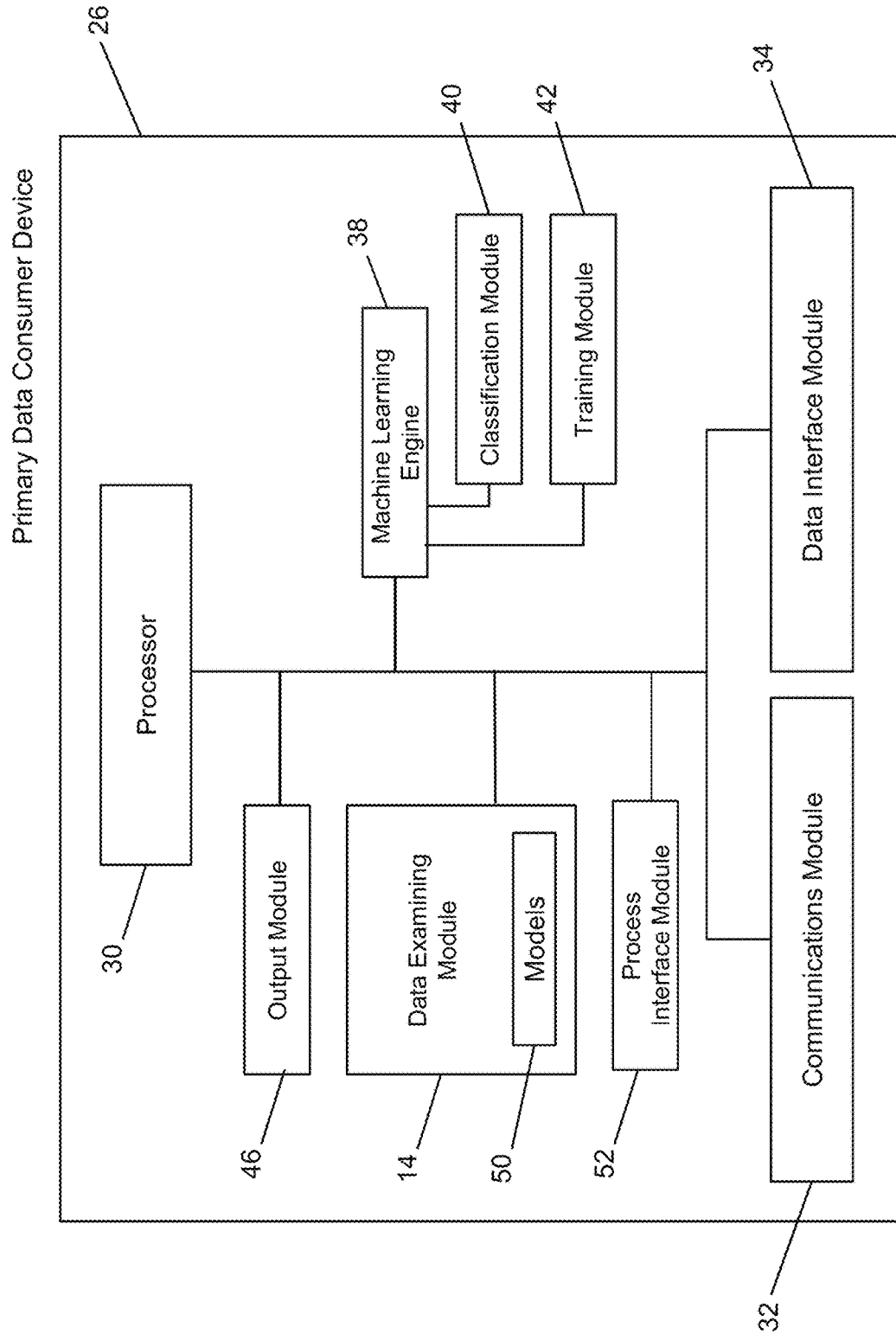
FIG. 3 is a block diagram of an example configuration of a primary data consumer device.

In FIG. 3, an example configuration of the primary data consumer device 26 is shown. In certain embodiments, the primary data consumer device 26 may include one or more processors 30, a communications module 32, and a data interface module 34 for interfacing with the external data source 12a and/or internal data source 12b to retrieve and store data. Communications module 32 enables the primary data consumer device 26 to communicate with one or more other components of the computing environment 20, such as data source device 22, secondary consumer device 28, 3$^{rd}$ party device 29 (or one of its components), via a bus or other communication network, such as the communication network 24. While not delineated in FIG. 3, the primary data consumer device 26 includes at least one memory or memory device that can include a tangible and non-transitory computer-readable medium having stored therein computer programs, sets of instructions, code, or data to be executed by processor 30, FIG. 3 illustrates examples of modules, tools and engines stored in memory on the primary consumer device 26 and operated by the processor 30. It can be appreciated that any of the modules, tools, and engines shown in FIG. 3 may also be hosted externally and be available to the primary consumer device 26, e.g., via the communications module 32.

In the example embodiment shown in FIG. 3, the primary data consumer device 26 includes a machine learning engine 38, a classification module 40, a training module 42, an output module 46, the data examining module 14 storing or having access to one or more statistical models 50, and a process interface module 52.

The machine learning engine 38 is used by the data examining module 14 to generate and train statistical models 50 to be used in forecasting data to compare with current data being processed by the data examining module 14. In one example embodiment, the data examining module 14 generates multiple statistical models 50 using historical data and a forecast for each model 50. This enables the data examining module 14 to apply at least one criterion (e.g., sum of R-squared) to select a preferred or best model 50 and generate a new forecast with the selected model 50, to identify unexpected values in the current data. The data examining module 14 may utilize or otherwise interface with the machine learning engine 38 to both classify data currently being analyzed to generate the statistical models 50, and to train classifiers using data that is continually being processed and accumulated by the primary data consumer device 26.

The machine learning engine 38 may also perform operations that classify the data from the data source(s) 12a/12b in accordance with corresponding classifications parameters, e.g., based on an application of one or more machine learning algorithms to the data. The machine learning algorithms may include, but are not limited to, a one-dimensional, convolutional neural network model (e.g., implemented using a corresponding neural network library, such as Keras®), and the one or more machine learning algorithms may be trained against, and adaptively improved using, elements of previously classified profile content identifying expected datapoints. Subsequent to classifying the data, the machine learning engine 38 may further process each data point to identify, and extract, a value characterizing the corresponding one of the classification parameters, e.g., based on an application of one or more additional machine learning algorithms to each of the data points. By way of the example, the additional machine learning algorithms may include, but are not limited to, an adaptive natural language processing algorithm that, among other things, predicts starting and ending indices of a candidate parameter value within each data point, extracts the candidate parameter value in accordance with the predicted indices, and computes a confidence score for the candidate parameter value that reflects a probability that the candidate parameter value accurately represents the corresponding classification parameter. As described herein, the one or more additional machine learning algorithms may be trained against, and adaptively improved using, the locally maintained elements of previously classified data. Classification parameters may be stored and maintained using the classification module 40, and training data may be stored and maintained using the training module 42.

In some instances, classification data stored in the classification module 40 may identify one or more parameters, e.g., "classification" parameters, that facilitate a classification of corresponding elements or groups of recognized data points based on any of the exemplary machine learning algorithms or processes described herein. The one or more classification parameters may correspond to parameters that can identify expected and unexpected data points for certain types of data.

In some instances, the additional, or alternate, machine learning algorithms may include one or more adaptive, natural-language processing algorithms capable of parsing each of the classified portions of the data being examined and predicting a starting and ending index of the candidate parameter value within each of the classified portions. Examples of the adaptive, natural-language processing algorithms include, but are not limited to, natural-language processing models that leverage machine learning processes or artificial neural network processes, such as a named entity recognition model implemented using a SpaCy® library.

Examples of these adaptive, machine learning processes include, but are not limited to, one or more artificial, neural network models, such as a one-dimensional, convolutional neural network model, e.g., implemented using a corresponding neural network library, such as Keras®. In some instances, the one-dimensional, convolutional neural network model may implement one or more classifier functions or processes, such a Softmax® classifier, capable of predicting an association between a data point and a single classification parameter and additionally, or alternatively, multiple classification parameters.

Based on the output of the one or more machine learning algorithms or processes, such as the one-dimensional, convolutional neural network model described herein, machine learning engine 38 may perform operations that classify each of the discrete elements of the data being examined as a corresponding one of the classification parameters, e.g., as obtained from classification data stored by the classification module 40.

The outputs of the machine learning algorithms or processes may then be used by the data examining module 14 to generate and train the models 50 and to use the models 50 to determine if data points in the current data being examined are expected or unexpected.

Referring again to FIG. 3, the output module 46 may be used to provide one or more outputs based on the results generated by the data examining module 14. Example outputs include a visual output in a GUI; a flag, alert or message in a process using (or about to use) the data being examined; or a process instruction operable to pause, interrupt or halt the process in view of the results of the data examining. The output module 46 may be configured to interface with the process 18 via the process interface module 52. The data examining module 14 may also be configured to interface with the process 18 via the process interface module 52. The output module 46 and process interface modules 52 may be embodied as APIs when interfacing with software-based processes 18 or may include a combination of software and hardware when interfacing with processes 18 that have hardwired or software/hardware-type interfaces. The data examining module 14 may be programmed to translate between multiple protocols in order to interface with other components to provide such outputs and such translation can occur within the data examining module 14 and/or the output module 46 or process interface module 52. It can be appreciated that the functionality provided by the output module 46 and process interface module 52 are delineated as shown in FIG. 3 for illustrative purposes and such functionality may also be integrated together or into the data examining module 14 in other example embodiments.

Figure 4:
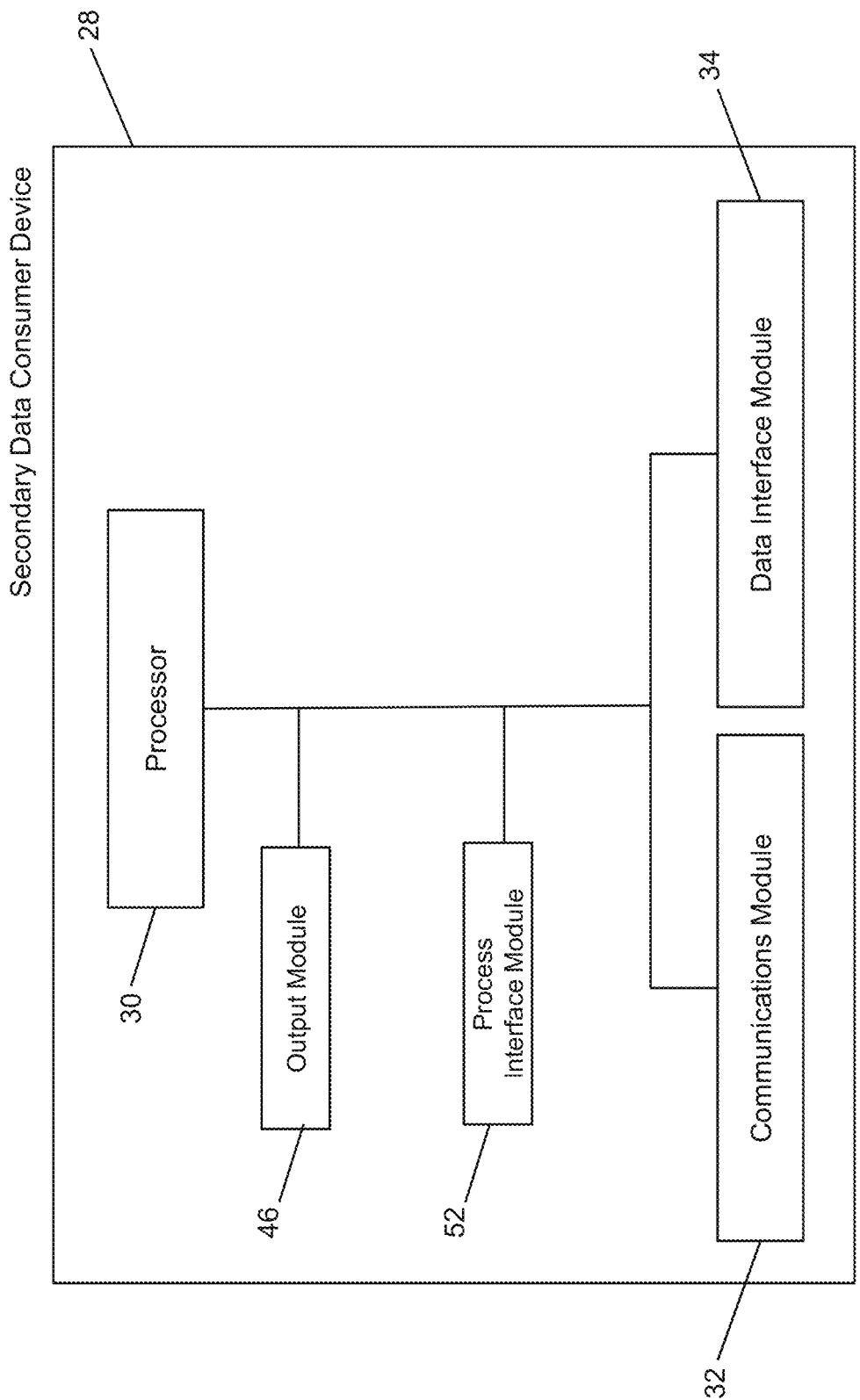
FIG. 4 is a block diagram of an example configuration of a secondary data consumer device.

FIG. 4 an example configuration of the secondary data consumer device 28 is shown. In certain embodiments, the secondary data consumer device 28 may include one or more processors 30, a communications module 32, and a data interface module 34 for interfacing with the primary data consumer device 26 to retrieve and store data that has been examined by the primary data consumer device 26. As shown in FIG. 2, the secondary data consumer device 28 utilizes the examined data in its own process 18. Communications module 32 enables the secondary data consumer device 28 to communicate with one or more other components of the computing environment 20, via a bus or other communication network, such as the communication network 24, similar to the primary data consumer device 26. While not delineated in FIG. 4, the secondary data consumer device 28 includes at least one memory or memory device that can include a tangible and non-transitory computer-readable medium having stored therein computer programs, sets of instructions, code, or data to be executed by processor 30. FIG. 4 illustrates examples of modules, tools and engines stored in memory on the secondary consumer device 28 and operated by the processor 30. It can be appreciated that any of the modules, tools, and engines shown in FIG. 4 may also be hosted externally and be available to the secondary consumer device 28, e.g., via the communications module 32.

Similar to the primary data consumer device 26, the secondary data consumer device 28 may include an output module 46 to provide one or more outputs based on the results generated by the data examining module 14 and/or the process 18 utilized by the primary data consumer device 26. The secondary data consumer device 26 may also include a process interface module 52 to interface with its process 18, similar to that explained above in connection with the primary data consumer device 26.

While not shown in the figures, the $3^{rd}$ party device 29 may also be configured in a manner similar to the secondary data consumer device 28 to enable the $3^{rd}$ party device 29 to report, publish, or otherwise use the data from a data source 12 that has been processed by either or both the primary and secondary data consumer devices 26, 28.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the data source 12, data source device 22, primary data consumer device 26, secondary data consumer device 28, or $3^{rd}$ party device 29, or accessible or connectable thereto. Any application or module herein described may be implemented using computer readable/executable instructions that may be stored or otherwise held by such computer readable media.

Referring to FIG. 5, an example illustrating computer executable stages executed by the data examining module 14 in performing data integrity and data quality processing is shown. In this example embodiment, four stages are shown, namely a raw data set stage 60, a data integrity processing stage 62, a data quality processing stage 64, and an output stage 66. The raw data set stage 60 may include receiving or obtaining raw data from a data source 12, which may be an external data source 12a or an internal data source 12b. The raw data obtained in this stage 60 may include univariate, time-series-based data, namely a sequence of measurements of the same variable collected over time. The raw data set stage 60 may also allow for customization to allow for other types of data. The raw data set stage 60 can include having the data examining module 14 detect the arrival of a data set from a data source 12 and determine if that data set should be processed by the data examining module 14. For example, the primary data consumer device 26 can store a look-up table to list the data sources 12 that are to be processed by the data examining module 14 such that when a new data set arrives, the primary data consumer device 26 can read the look-up table and execute any data source 12 in the look-up table, according to the processes shown in FIG. 5.

The data integrity processing stage 62 can be executed upon receiving the raw data and determining that the corresponding data set should be examined by the data examining module 14. The data integrity processing stage 62 may include one or more data integrity operations. For example, the data examining module 14 may perform a missing data check to determine if there is any missing data in the data set to be examined. The data examining module 14 may also perform a dataset size check by performing a differencing between the current data set and the historical data, to determine the delta of the number of datapoints (i.e. observations), and thus confirm that the size of the dataset is correct. If these checks fail, the data examining module 14 may terminate its routine. The data integrity processing stage 62 may also perform a date formatting operation, e.g., to standardize the dates in the data set into a valid time-series.

The data quality processing stage 64 includes the statistical analyses described in greater detail below to identify unexpected values in the data set, and therefore the quality of the data to be used in the process 18. The data quality processing stage 64 includes generating multiple models 50 based on historical data and a forecast for each of the models 50 and comparing a forecast with a selected model 50 with the current (i.e., actual) data to be examined. Any unexpected values that are captured may then be output in the output stage 66, e.g., as discussed above.

FIG. 6 expands on the illustration shown in FIG. 5 to provide an example embodiment for performing the data quality processing stage 64. In this example embodiment, a data analysis operation 70 is performed to train and build multiple statistical models 50 based on the historical data and forecasts for each of the models 50. In this example, Model 1, Model 2, and Model N are shown, and it can be appreciated that the following examples include the use of three statistical models 50 for illustrative purposes. The data examining module 14 may then use the forecasts for each of the generated models 50 to perform a model selection operation 72. The model selection operation 72 selects the desired, best or most preferred of the statistical models 50 that have been generated in operation 70. For example, the "best" model 50 can be chosen based on which model 50 has the smallest sum of residual squares (also referred to here as the "sum of R-squared"), such that the forecast is closest to the current (i.e. actual) data being analyzed.

A model analysis operation 74 may then be performed using the selected model 50, by generating a new forecast using the selected model, i.e., by "re-running" the forecast. This new forecast is then compared to the current data to identify any data points in the set of current data with unexpected values. For example, the univariate time-series may include an unexpected change between data points, which would be identified in the comparison with the new forecast.

The data point can be captured according to certain criteria. For example, the data examining module 14 can capture data points only when the data point satisfies the following criteria:
a) the data point is outside of the 95% prediction interval, i.e., the interval built from a pre-processed dataset and not the current (actual) number; and
b) the data point is outside of the 95% prediction interval from the pre-processed data that was reverted back to an original scale.

The output stage 66 can include exporting or otherwise outputting the unexpected values to a particular format depending on the nature of the output. For example, the data examining module 14 may be configured to output an XML file with the results of the model analysis operation 74 that can be formatted into an HTML file for consumption by a software collaboration tool, e.g., Confluence™.

Figure 7:
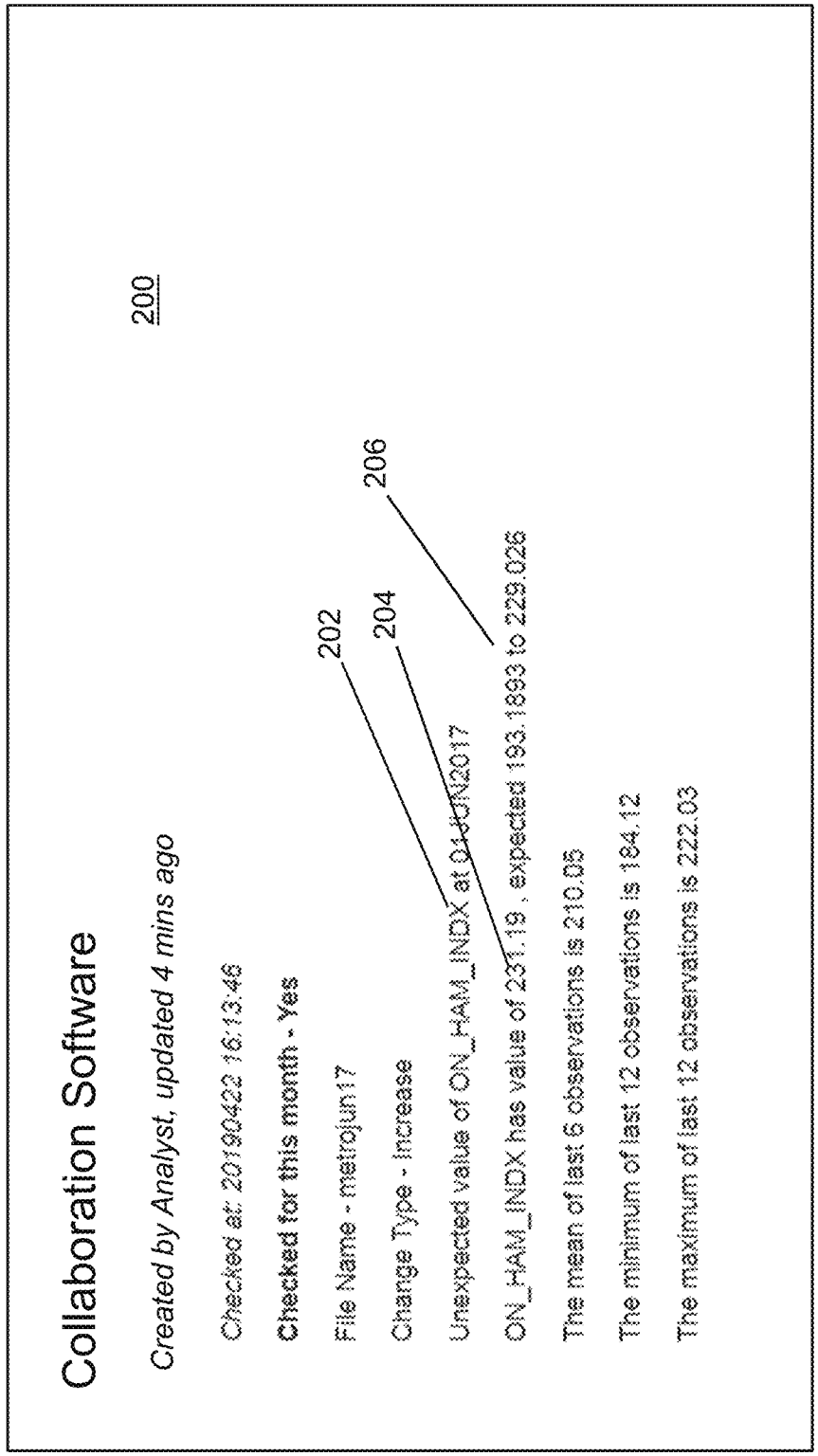
FIG. 7 is an example of a graphical user interface displaying an output of the data quality check workflow.

An example of such an output page 200 is shown in FIG. 7. In the example page 200 shown in FIG. 7, the data set is identified, along with time stamp information for when the data analysis was performed, and the time period associated with the data set. The page 200 also includes an unexpected value flag 202 for a housing price index time-series. The unexpected value 204 and the expected range 206 are also listed on the page 200. The page 200 may also list other information, such as the mean, maximum, or minimum from recent historical data to provide some context to the outputs. It can be appreciated that the information provided in the page 200 may be monitored by an analyst and/or operator of the process 18 to determine whether or not to begin, continue or abort the process 18. The information can also be used to automatically generate a process instruction, e.g., to have the process 18 halted or interrupted pending a review of the data analysis output(s).

Figure 8:
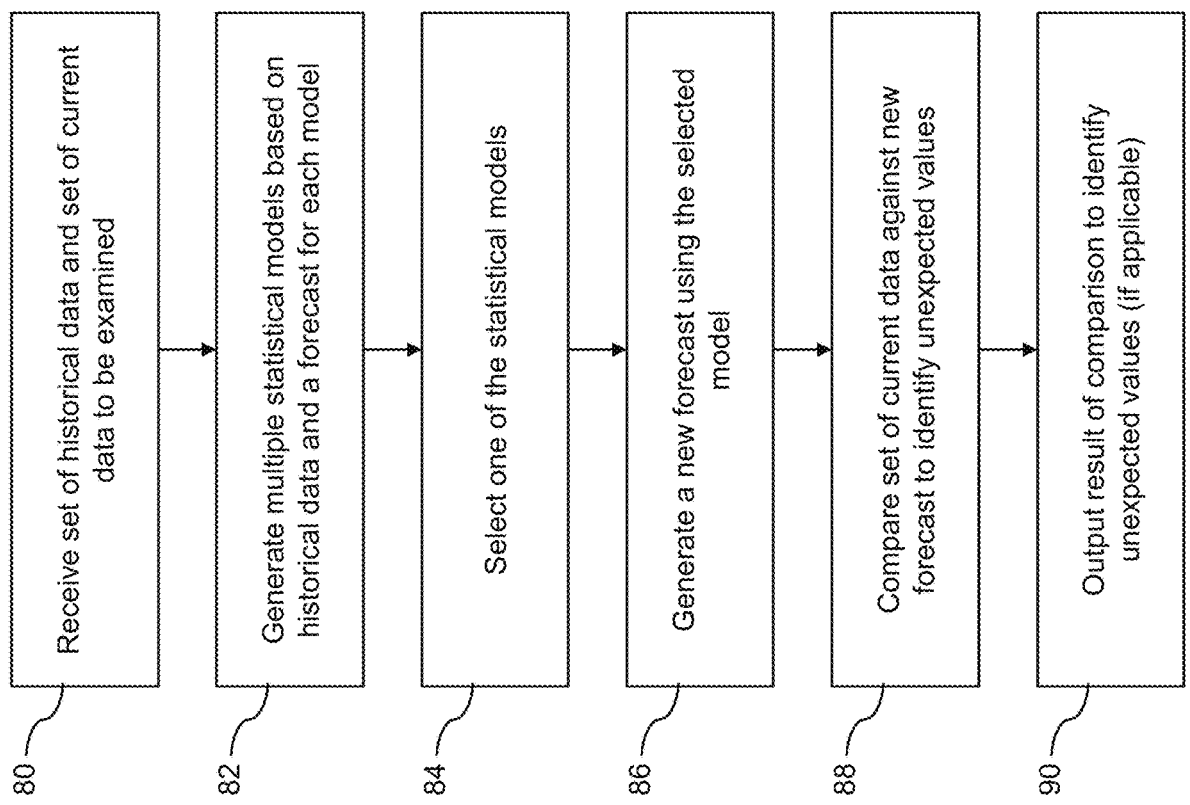
FIG. 8 is a flow diagram of an example of computer executable instructions for examining data from a source.

Referring to FIG. 8, an example embodiment of computer executable instructions for examining data from a source is shown. At block 80, the data examining module 14 receives a set of historical data and a set of current or "actual" data to be examined. It can be appreciated that in some example embodiments, the current data corresponds to real-time or near real-time data that is being obtained or received. The current data can be processed according to a trigger or can be processed automatically. At block 82, the data examining module 14 generates multiple (e.g., three) statistical models 50 based on the historical data set of a forecast for each model 50, as explained in greater detail below. One of the statistical models 50 is selected at block 84 and a new forecast is generated at block 86 using the selected model 50. At block 88, the data examining module 14 then compares the set of current data against the new forecast (i.e. "re-run" with the selected model) to identify any unexpected values in the current data that is to be used by the process 18. At block 90, the data examining module 14 may then output the result of the comparison to identify the unexpected values, if applicable. For example, a graphical output as illustrated in FIG. 7 can be provided. A process instruction may also be generated to interrupt the process 18 pending a review of the potentially bad data.

Figure 9:
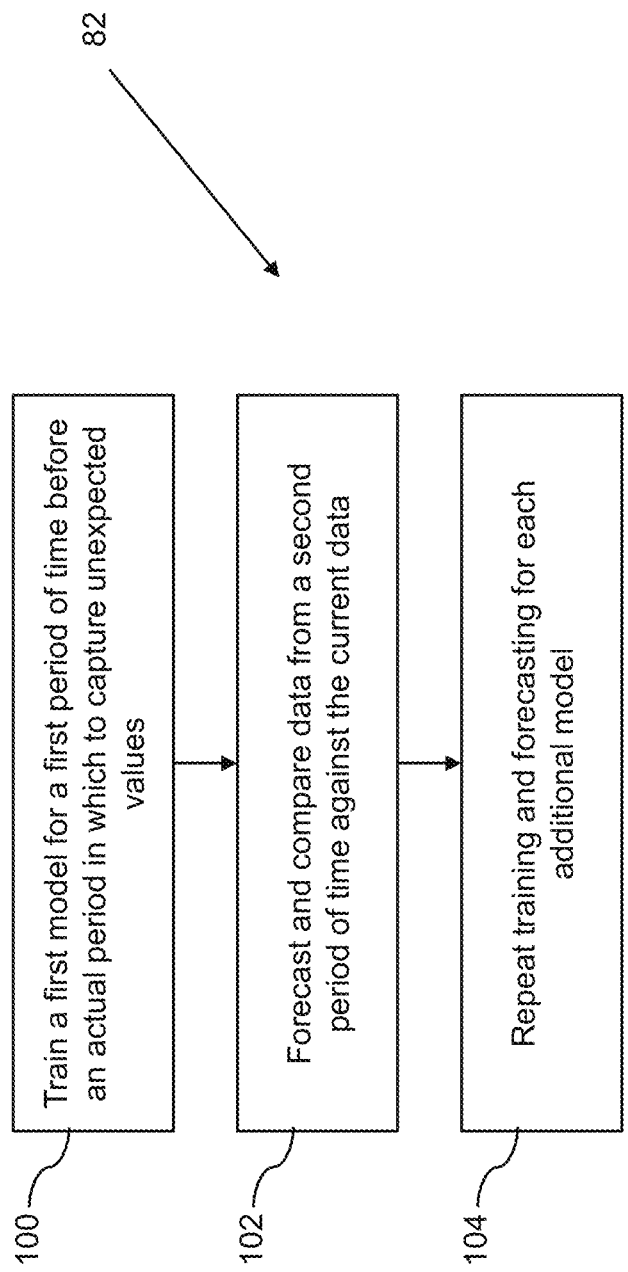
FIG. 9 is a flow diagram of an example of computer executable instructions for generating multiple statistical models.

Referring to FIG. 9, an example embodiment of computer executable instructions for performing block 82 from FIG. 8 is shown. At block 100, the data examining module 14 trains a first model for a first period of time before an actual period in which to capture the unexpected values. At block 102, the data examining module 14 forecasts and compares data from a second period of time against the current data. As indicated at block 104, the training and forecasting operations at blocks 100 and 102 are repeated for each additional model.

Referring now to FIGS. 10-15, an example process for performing the statistical analyses in the data quality processing stage 64 will now be provided. In the present example, a statistical model is built that can capture abnormal changes for an incoming time-series based dataset. It is found that forecasts by modelling all explanatory variables can be quite complex and there may not be enough raw data to model all explanatory variables. To address this consideration, the data examining module 14 can perform a future prediction based on historical data. Due to different time scales used for various types of data, the model 50 that is generated by the data examining module 14 can standardize the input data before further processing, as discussed above. Even after standardizing the input data, it has been found that some datasets may still have wide prediction intervals, which can cause false positives. To address this consideration, the data examining module 14 can difference the datasets after standardization.

There are some considerations that may be taken when determining which model 50 to use in the model selection operation 72. First, since the desired model 50 in the present example is targeting time-based data sets and there should be recurring data for these datasets, the model 50 should be capable of updating its own formula that is developed across the time-series. Second, an objective of the model 50 is to capture abnormal changes in the datasets by comparing current incoming data to the forecasts based on historical data. As such, the most recent data should be weighted more heavily than data in the early part of the time-series. Third, due to the possibility of there being various types of datasets, models 50 with different trends may be required.

In view of the above, a suitable example computational scheme is exponential smoothing, e.g., as derived by Brown and Meyer (G. Brown, Robert & F. Meyer, Richard. (1961). *The Fundamental Theorem of Exponential Smoothing. Operations Research.* 9. 673-685). An exponential smoothing model fits a trend model such that the model applies the most weight on the most recent data and updates its formula when there are any appending data points to the whole time-series. The following exemplifies three exponential smoothing formulae, with different trend options.

Trend 1 is a single exponential smoothing, also referred to as a constant model, with the following formula:

$$S_t = \omega x_t + (1-\omega) S_{t-1}$$

Trend 2 is a double exponential smoothing, also referred to as a linear trend model, with the following formula:

$$S_t^{[2]} = \omega S_t + (1-\omega) S_{t-1}^{[2]}$$

Trend 3 is a triple exponential smoothing, also referred to as a quadratic trend model, with the following formula:

$$S_t^{[3]} = \omega S_t^{[2]} + (1-\omega) S_{t-1}^{[3]}$$

In the above formulae, $S_t$ is the final smoothed value at the observation t, with different trend parameters, $\omega$ is the weighting constant, t is the time index of the current period, and $x_t$ is the specific current value of the series being examined.

After forecasting the most recent data with the three trend parameters illustrated above (i.e., constant, linear, and quadratic), a final model is selected according to at least one criterion. In this example embodiment, the at least one criterion determines the smallest sum of R-squared for the test dataset. R-squared is a statistical measure that represents the proportion of the variance in a regression model and is computed by dividing the sum of first errors by the sum of second errors and subtracting the derivation from 1.

Figure 10:
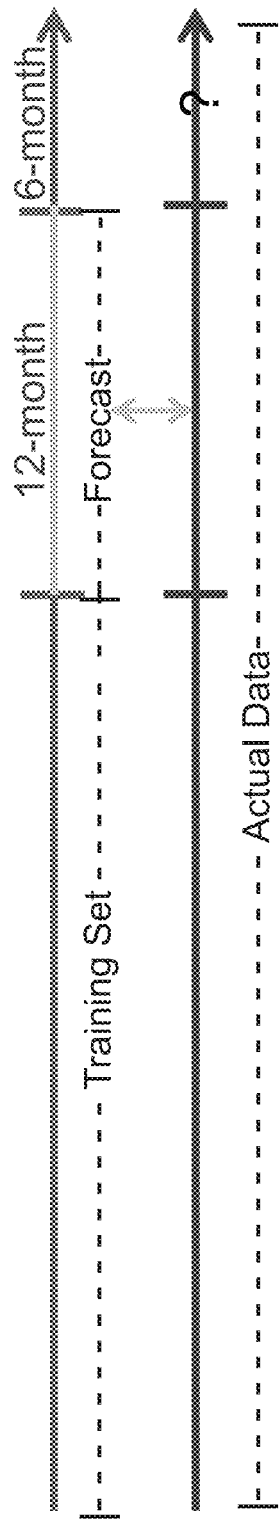
FIG. 10 is a graphical illustration of a first level forecast performed using multiple models.

First, referring to FIG. 10, the model can be trained for a first period of time before the actual period in which the model wants to capture potential abnormal changes. In FIG. 10, the first period of time is chosen to be 12 months, for a 6 months period of time for which the model wants to capture the abnormal changes (identified by "?" in FIG. 10). Continuing with this example, the data examining module 14 then forecasts the 12-month data (as identified in FIG. 10) and compares the 12 months of data against the actual data (shown below in FIG. 10) to determine how good that model would have been at forecasting the actual data during that time period. The process illustrated in FIG. 10 is repeated for each of the trend parameters identified above, and the sum of R-squared is calculated for each.

Figure 11:
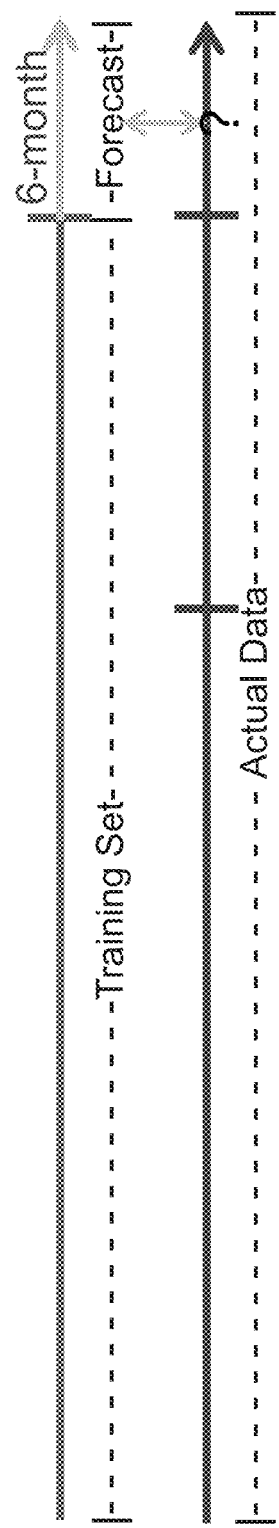
FIG. 11 is a graphical illustration of a second level forecast performed using a selected model.

Second, referring to FIG. 11, the data examining module 14 generates a new forecast with the best model 50, in this case, the model 50 which has the smallest sum of R-squared from the previous operation. The data examining module 14 then runs forecasts for the current period (identified by "Forecast" in FIG. 11) to be examined and compares the current data against the prediction intervals from the forecast to capture the abnormal changes.

Figure 13:
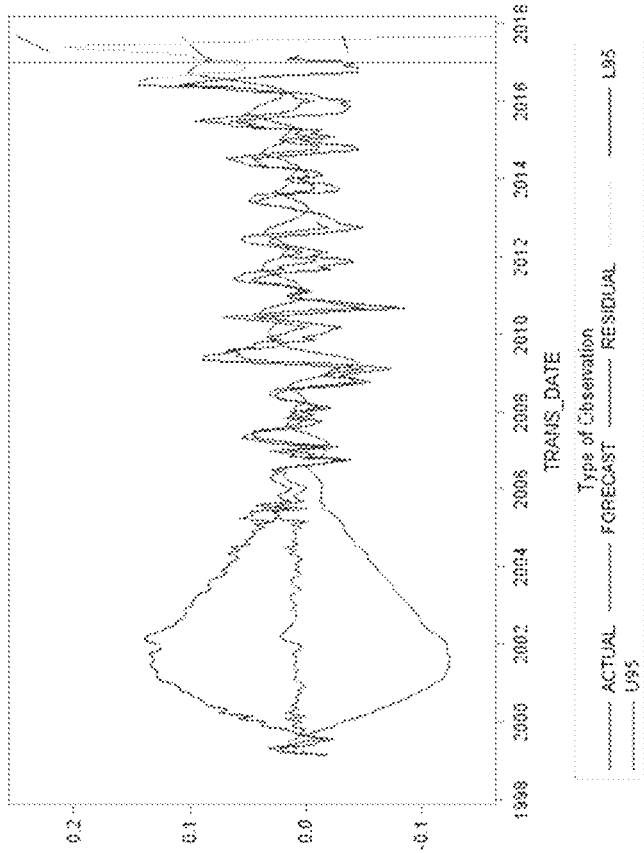
FIG. 13 is a chart illustrating a forecast for the housing price index data in FIG. 12.
Figure 12:
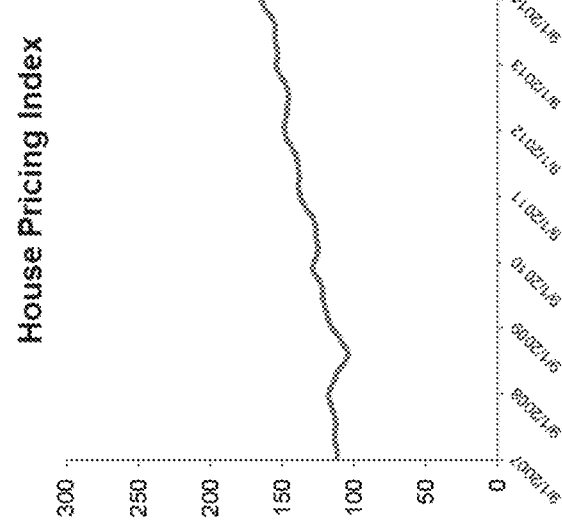
FIG. 12 is a chart illustrating an example of housing price index data over a period of time.

A first example of an outcome of the data examining process is shown in FIG. 12 for non-stationary data, namely for a housing price index. FIG. 12 provides a chart with a time-series for a particular time period (i.e. the original data input), and FIG. 13 provides a forecast for this data. The graph in FIG. 13 illustrates how the model 50 examines the abnormal changes by comparing the actual data to the prediction interval of the forecast. The data points outside of the prediction intervals are captured as abnormal changes. A data point with an unexpected change is identified in FIG. 12 using a dashed line.

Figures 14, 15:
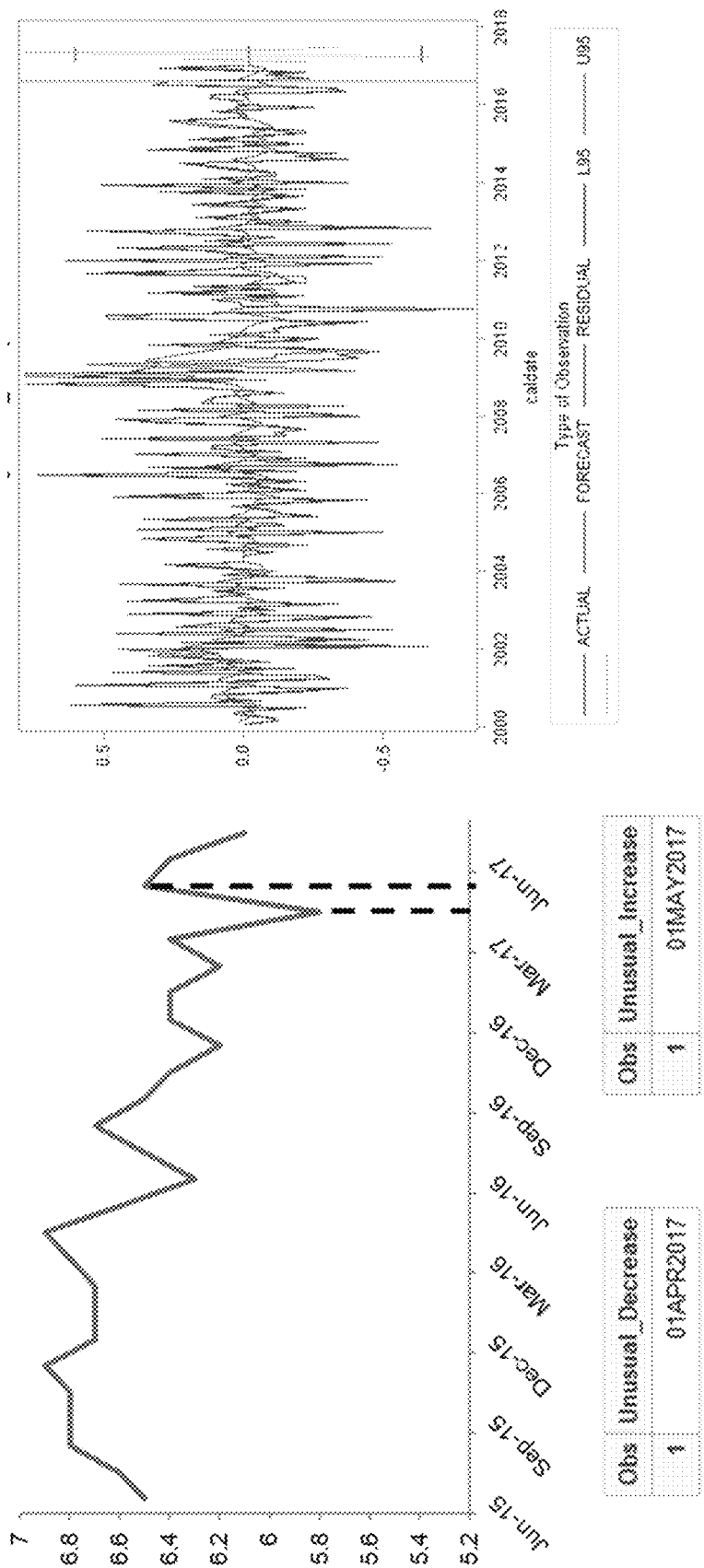
FIG. 14 is a chart illustrating an example of unemployment data over a period of time.
FIG. 15 is a chart illustrating a forecast for the unemployment data in FIG. 14.

A second example of an outcome of the data examining process is shown in FIG. 14 for stationary data, namely unemployment rate data. FIG. 14 provides a chart with a time-series for a particular time period, and FIG. 15 provides a forecast for this data. In FIG. 14, two data points with unexpected changes are identified using dashed lines.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A device for examining data from a source used in downstream processes, the device comprising:
   a processor;
   a data interface coupled to the processor; and
   a memory coupled to the processor, the memory storing computer executable instructions that when executed by the processor cause the processor to:
      obtain access to a plurality of statistical models, each of the plurality of statistical models having been generated based on a set of historical data for a first period of time and a forecast for each model by:
         training a first model with data from a second period of time of the set of historical data, the second period being a subset of the first period;
         forecasting data for a third period of time, subsequent to the second period, and a subset of the first period, and comparing the forecasted data for the third period with the corresponding set of historical data; and
         repeating the training and forecasting for each of the plurality of statistical models;
      select one of the plurality of statistical models by evaluating the models based on how good each model would have been at forecasting current data during the period of time associated with the forecast, by comparing data generated by each model to a set of current data for a fourth period of time, to determine which of the models generates a forecast whose values are closest to the set of current data being analyzed, the fourth period of time subsequent to the first period of time;
      generate a new forecast using the selected model, the new forecast predicting occurrences during the fourth period of time;
      compare the set of current data against the predicted occurrences in the new forecast to identify any data points in the set of current data with unexpected values; and
      responsive to detecting one or more data points with unexpected values, interrupt or stop the downstream process that uses the current data, to enable an investigation to be conducted.

2. The device of claim 1, wherein the computer executable instructions further cause the processor to:
   output a result of the comparison, the result comprising any data points with the unexpected values.

3. The device of claim 2, wherein the computer executable instructions further cause the processor to:
   upload the result of the comparison to a graphical user interface.

4. The device of claim 1, wherein the computer executable instructions further cause the processor to flag the data points with unexpected values in association with a process that uses the current data.

5. The device of claim 1, wherein generating the new forecast using the selected model comprises executing the selected model with a parameter having a smallest sum of R-squared from the forecasting and comparing.

6. The device of claim 1, wherein comparing the current data to the new forecast comprises running forecasts for the actual period and comparing the current data against at least one prediction interval from the new forecast to capture the unexpected values.

7. The device of claim 1, wherein the source comprises an external source of the current data.

8. The device of claim 1, wherein the source comprises an internal source of the current data.

9. The device of claim 1, wherein the plurality of statistical models comprise one or more of a constant model, a linear model, and a quadratic model.

10. The device of claim 9, wherein the constant model comprises applying a single exponential smoothing, the linear model comprises applying a double exponential smoothing, and the quadratic model comprises applying a triple exponential smoothing.

11. The device of claim 1, wherein the computer executable instructions further cause the processor to:
automatically execute when receiving new data from the source.

12. The device of claim 1, wherein the current and historical data are time-series-based data.

13. The device of claim 1, wherein data points are deemed to be expected if one or more of the following is satisfied:
the data point is outside of a 95% prediction interval built on a pre-processed dataset; and
the data point is outside of the 95% prediction interval from the pre-processed data that was reverted back to an original scale.

14. The device of claim 1, wherein the computer executable instructions further cause the processor to:
receive via the data interface raw data from the source; and
apply at least one data integrity operation on the raw data.

15. The device of claim 14, wherein the at least one data integrity operation comprises any one or more of: a missing data check, a dataset size check, and date formatting operation to generate a valid time-series.

16. A method of examining data from a source used in downstream processes, the method executed by a device having a processor, and comprising:
obtaining access to a plurality of statistical models, each of the plurality of statistical models generated based on a set of historical data for a first period of time and a forecast for each model by:
training a first model with data from a second period of time of the set of historical data, the second period being a subset of the first period;
forecasting data for a third period of time, subsequent to the second period, and a subset of the first period, and comparing the forecasted data for the third period with the corresponding set of historical data; and
repeating the training and forecasting for each of the plurality of statistical models;
selecting one of the plurality of statistical models by evaluating the models based on how good each model would have been at forecasting current data during the period of time associated with the forecast, by comparing data generated by each model to a set of current data for a fourth period of time, to determine which of the models generates a forecast whose values are closest to the set of current data being analyzed, the fourth period of time subsequent to the first period of time;
generating a new forecast using the selected model, the new forecast predicting occurrences during the fourth period of time;
comparing the set of current data against the predicted occurrences in the new forecast to identify any data points in the set of current data with unexpected values; and
responsive to detecting one or more data points with unexpected values, interrupting or stopping the downstream process that uses the current data, to enable an investigation to be conducted.

17. The method of claim 16, further comprising:
outputting a result of the comparison, the result comprising any data points with the unexpected values.

18. The method of claim 17, further comprising:
uploading the result of the comparison to a graphical user interface.

19. The method of claim 16, further comprising flagging the data points with unexpected values in association with a process that uses the current data.

20. A non-transitory computer readable medium for examining data from a source used in downstream processes, the computer readable medium comprising computer executable instructions for:
obtaining access to a plurality of statistical models, each of the plurality of statistical models having been generated based on a set of historical data for a first period of time and a forecast for each model by:
training a first model with data from a second period of time of the set of historical data, the second period being a subset of the first period;
forecasting data for a third period of time, subsequent to the second period, and a subset of the first period, and comparing the forecasted data for the third period with the corresponding set of historical data; and
repeating the training and forecasting for each of the plurality of statistical models;
selecting one of the plurality of statistical models by evaluating the models based on how good each model would have been at forecasting current data during the period of time associated with the forecast, by comparing data generated by each model to a set of current data for a fourth period of time, to determine which of the models generates a forecast whose values are closest to the set of current data being analyzed, the fourth period of time subsequent to the first period of time;
generating a new forecast using the selected model, the new forecast predicting occurrences during the fourth period of time;
comparing the set of current data against the predicted occurrences in the new forecast to identify any data points in the set of current data with unexpected values; and
responsive to detecting one or more data points with unexpected values, interrupting or stopping the downstream process that uses the current data, to enable an investigation to be conducted.

\* \* \* \* \*